United States Patent [19]
Flippo et al.

[11] Patent Number: 6,131,037
[45] Date of Patent: *Oct. 10, 2000

[54] METHOD FOR TRANSMITTING LOCAL AREA/WIDE AREA MESSAGES AND SELECTIVE CALL RECEIVER FOR USE THEREWITH

[75] Inventors: Robert S. Flippo, Deerfield Beach; Enrique E. Calistro, Cooper City; Troy A. Bailey, Lake Worth, all of Fla.

[73] Assignee: Motorola Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/980,081

[22] Filed: Nov. 26, 1997

Related U.S. Application Data

[62] Division of application No. 08/606,950, Feb. 26, 1996, Pat. No. 5,740,541.

[51] Int. Cl.[7] ........................................... H04B 7/00
[52] U.S. Cl. ................................. 455/503; 340/825.44
[58] Field of Search ..................... 455/31.2, 31.3, 455/32.1, 38.1, 38.2, 38.4, 343, 426, 456, 458, 447, 517, 524, 503; 340/825.44; 370/328, 336, 337, 338, 345, 347, 428

[56] References Cited

U.S. PATENT DOCUMENTS

| | | | |
|---|---|---|---|
| 5,224,150 | 6/1993 | Neustein | 455/31.2 |
| 5,327,581 | 7/1994 | Goldberg | 455/503 |
| 5,493,286 | 2/1996 | Grube et al. | 455/38.1 |
| 5,561,702 | 10/1996 | Lipp et al. | 455/31.2 |
| 5,711,007 | 1/1998 | Lin et al. | 455/447 |

*Primary Examiner*—Andrew I. Faile
*Assistant Examiner*—Christopher Onuaku
*Attorney, Agent, or Firm*—Randi L. Dulaney; Phil P. Macnak

[57] ABSTRACT

A selective call receiver (102) for use in a communication system (100) includes a receiver (404), a memory (412), and a processor (408). The receiver (404) is capable of receiving a message code (314) during a first frame from a first transmitter and the same message code (314) during a second frame from a second transmitter. The memory (412) stores a first and a second canned message, wherein the first canned message corresponds to the message code (314) being received in the first frame and the second canned message corresponds to the same message code (314) being received in the second frame. The processor (408) is responsive to the message code (314) for identifying the first canned message in the memory (412) corresponding to the message code (314) and the first frame, and identifying the second canned message in memory (412) corresponding to the same message code (314) and the second frame.

4 Claims, 7 Drawing Sheets

METHOD FOR TRANSMITTING LOCAL AREA/WIDE AREA MESSAGES AND SELECTIVE CALL RECEIVER FOR USE THEREWITH

This is a divisional of application Ser. No. 08/606,950, filed Feb. 26, 1996 now U.S. Pat. No. 5,740,541.

FIELD OF THE INVENTION

This invention relates in general to RF (Radio Frequency) networks, and particularly to such networks that communicate with selective call receivers.

BACKGROUND OF THE INVENTION

Conventional wireless local area networks can be located within a wireless wide area network, with both types of networks operating on a single RF channel. A complex communication architecture is required to coordinate communication between the local area networks and the wide area network. In one such architecture, a synchronization link is utilized to coordinate a master-slave relationship between the wide area network and local area networks.

In a master-slave architecture, the wide area network is considered the master while the local area networks are the slaves. As the master, the wide area network takes priority for communicating with selective call receivers for which it has messages. Thus, when traffic density is high, the synchronization link gives the wide area network communication priority over the local area networks.

In order to prevent a lockout of the local area networks, the synchronization link restricts the wide area network from communicating with the selective call receivers beyond a predetermined time period. Once the predetermined time period has been exceeded, the synchronization link transfers communication priority to the local area networks.

Although this architecture is sometimes effective in delivering messages to selective call receivers, during times of high traffic densities it can prevent local area transmitters from delivering messages promptly to selective call receivers in their respective coverage areas. This situation can result in message latencies for local area networks that are inconsistent with customer expectations.

Thus, what is needed is a method and apparatus that provides prompt delivery of messages by wireless local area networks located within a wireless wide area network, with both networks operating on the same RF channel.

DESCRIPTION OF THE PREFERRED EMBODIMENT

Figure 1:
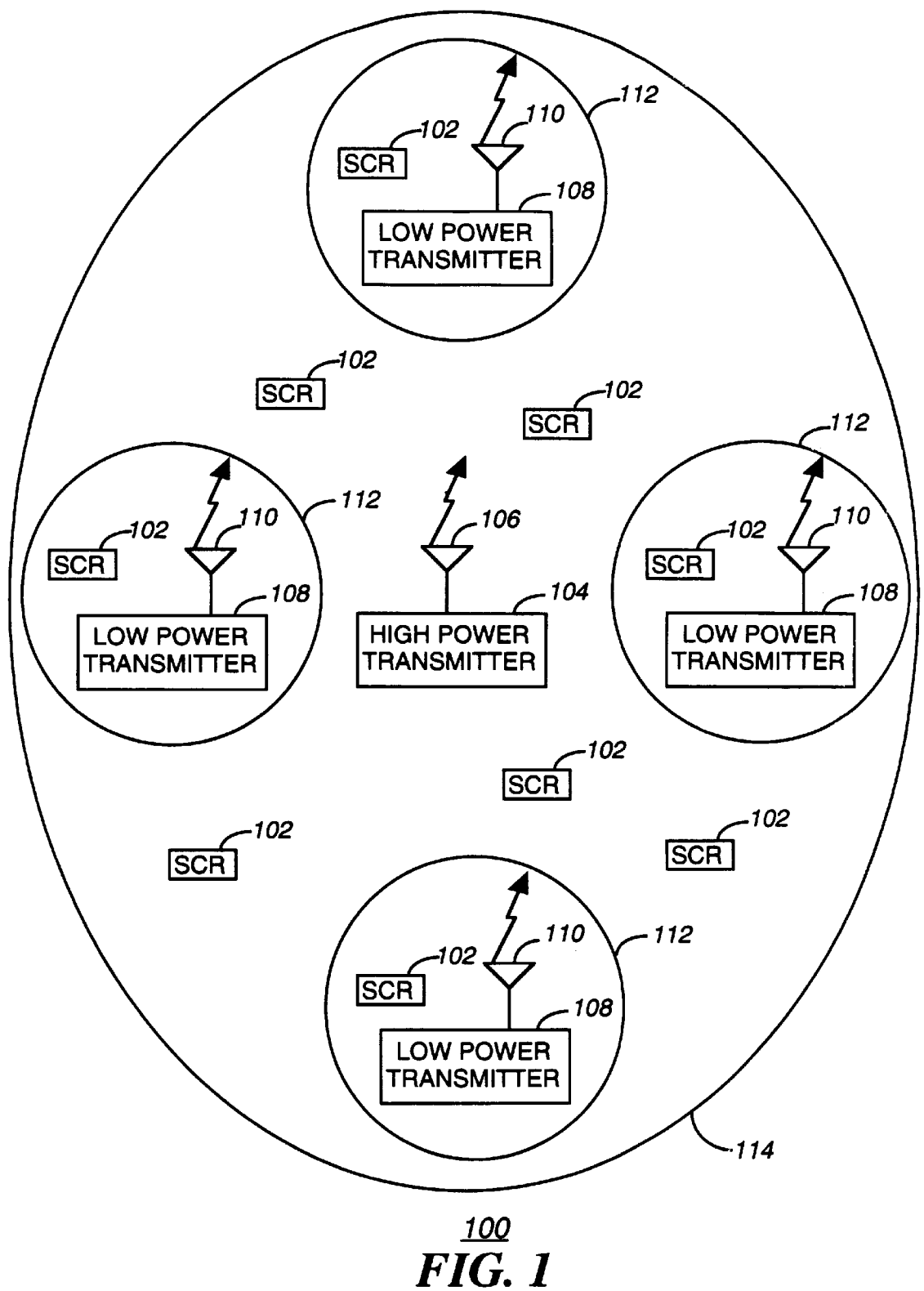
FIG. 1 is an electrical block diagram of a communication system that operates according to the present invention.

FIG. 1 is an electrical block diagram of a communication system 100 that operates according to the present invention. The illustrated communication system includes a relatively high power transmitter 104 for transmitting, on a given frequency, messages to selective call receivers 102 located within a relative wide coverage area 114. In addition, the communication system 100 includes a plurality of relatively low power transmitters 108 for transmitting, on the same given frequency, messages to selective call receivers 102 located within a plurality of relatively smaller coverage areas 112 that each overlap the relatively wide coverage area 114.

The high power transmitter 104 is coupled to a conventional transmitter antenna 106 for transmitting selective call messages to selective call receivers 102 located anywhere within the wide coverage area 114, including receivers 102 that are located within the smaller coverage areas 112. Radio frequency (RF) signals are transmitted by the high power transmitter 104 utilizing conventional means such as, for example, frequency shift-keyed (FSK) signals for transmitting digitized messages.

Similarly, each low power transmitter 108 is coupled to a conventional transmitter antenna 110 for transmitting information, including message codes and/or conventional messages, to selective call receivers 102 located within its own small coverage area 112. RF signals are transmitted by the low power transmitter 108 utilizing the same modulation scheme utilized by the high power transmitter. In contrast to the high power transmitter 104, the low power transmitter 108 has a limited transmission range for RF signals that can be intercepted by the selective call receivers 102. This range is essentially limited to the boundary of the small coverage area 112 shown in FIG. 1.

In operation, an individual receiver 102 may remain within a single given small coverage area 112, in which case it will be able to receive transmissions from the high power transmitter 104 and from the low power transmitter 108 that is located in the same given small coverage area 112.

Alternately, one or more of the receivers 102 may be expected to roam throughout the wide coverage area 114. In this case, the roaming receiver 102 could pass through all the smaller coverage areas 112 and through portions of the wide coverage area 114 that are not within one of the small coverage areas 112. Such a receiver will, as described later, be able to receive transmissions from the high power transmitter 104, as well as from each low power transmitter 108 that it comes within range of.

Figure 2:
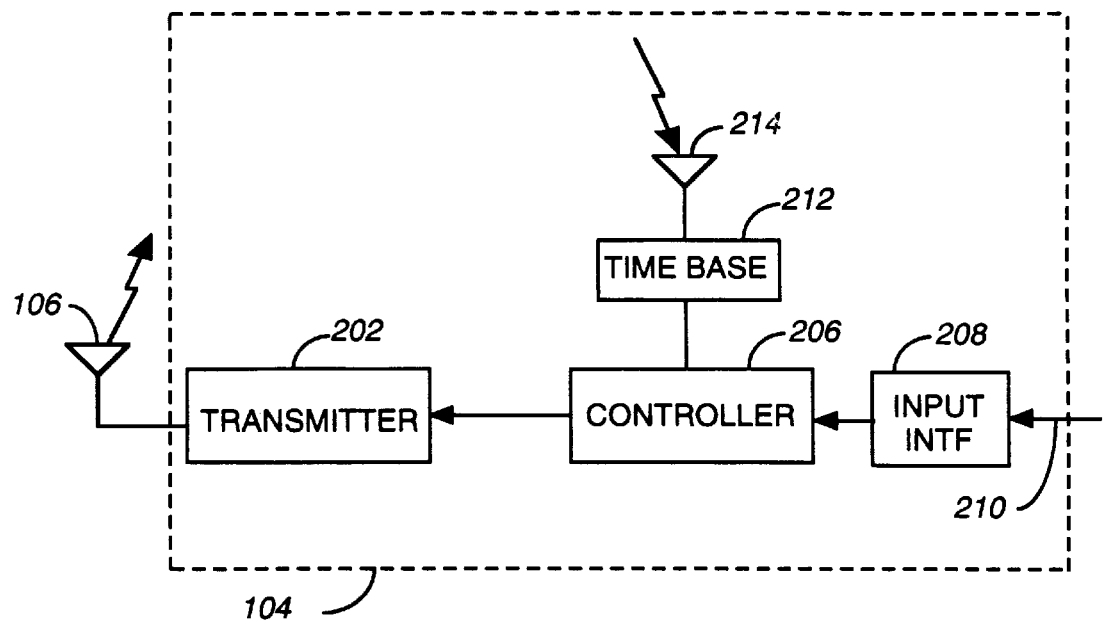
FIG. 2 is an electrical block diagram of the high power transmitter shown in FIG. 1.

FIG. 2 is an electrical block diagram of the high power transmitter 104. The block diagram includes an input interface 208, a controller 206, a time base 212, a time base antenna 214, and a transmitter 202.

The input interface 208 is coupled to a conventional wire communication link 210 such as, for example, a conventional telephone line coupled to a public switch telephone network (PSTN) for receiving messages originated by callers using a conventional telephone unit. It will be appreciated that, alternatively, the wire communication link 210 can be replaced with a conventional wireless communication link such as, for example, a microwave communication link.

The controller 206 is a conventional computer system used for controlling the operation of the high power transmitter 104. The controller 206 is coupled to the input interface 208 for receiving voice or data messages originated by a caller. The messages are processed by the controller 206 in accordance with a communication protocol utilized by the communication system (to be described below). The processed messages become selective call messages intended for transmission to one or more selective call receivers 102 located within the wide coverage area 114.

The time base 212 receives synchronization signals from a common time base such as, for example, a global positioning satellite (GPS). The synchronization signals are intercepted by the time base antenna 214 utilizing conventional means well known in the art. The time base 212 uses these signals to synchronize itself to the communication protocol.

The controller 206 is coupled to the time base 212 in order to process the selective call messages in a manner that synchronizes them to the communication protocol. The synchronized selective call messages are delivered by the controller 206 to the transmitter 202, which then modulates them for transmission to the selective call receivers 102 via antenna 106. The transmitter 202 transmits the selective call messages at an RF power level sufficient for the RF signals transmitted to be intercepted by selective call receivers 102 located anywhere within the wide coverage area 114, including those located within any one of the small coverage areas 112.

The low power transmitters 108 use substantially the same elements described in FIG. 2, with a few exceptions. An input interface like 208 is used by the low power transmitter 108 for receiving information, preferably in the form of message codes, for transmission to selective call receivers. A message code is a short digitized code (e.g., 8 bits) transmitted to one or more selective call receivers 102 for recalling a selected canned message from the memory of the intended selective call receiver 102 and presenting canned message to user(s) of the selective call receiver(s) 102.

It will be appreciated that, in addition to message codes, the low power transmitter 108 can receive message information from the input interface 208. This message information is transmitted along with the message code to the selective call receivers 102 located in the small coverage area 112. The message information comprises, for example, alpha-numeric messages or voice messages.

The input interface in a low power transmitter receives message codes from, for example, a local area controller (not shown) coupled to the low power transmitters 108 by way of conventional wire communication links, such as links 210. Alternatively, the low power transmitters 108 may be preprogrammed with the message codes, thereby eliminating the need for an input interface and a wire communication link in the low power transmitter 108.

The message codes are selectively transmitted by the low power transmitters 108 to the selective call receivers 102 by modulating the message codes at an RF power level sufficient for the generated RF signals to be intercepted by selective call receivers 102 located within a small coverage area 112. Selective call receivers 102 located outside the small coverage area 112 are not able to intercept the transmitted message codes.

There are several important similarities between the high power transmitter 104 and the low power transmitters 108. First, both types of transmitters use the same communication protocol. Second, the time bases 212 of each transmitter receives synchronization signals from the same common time base, i.e., the GPS time base. This allows the high power transmitter 104, and the plurality of low power transmitters 108 to synchronously transmit messages on the same communication protocol without interfering with each other.

Figure 3:
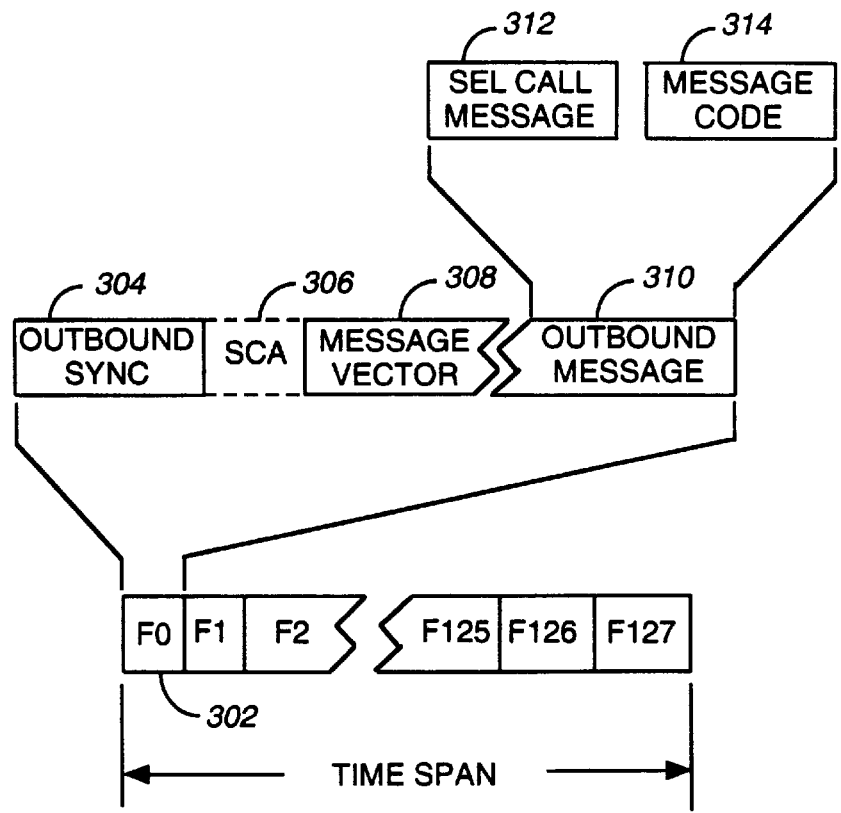
FIG. 3 is a timing diagram depicting the communication protocol used by the communication system of FIG. 1.

FIG. 3 is a timing diagram depicting the communication protocol 300 that is preferably used by the communication system 100. This protocol, developed by Motorola, Inc., is known as the FLEX digital selective call signaling protocol (Flex is a trademark of Motorola, Inc.) that is presently used by various system operators in the United States and in several other countries. More details of the Flex protocol can be found in U.S. Pat. No. 5,371,737, assigned to Motorola, Inc. It will be appreciated that other communication protocols that operate in a synchronous communication system and that are suitable to this invention can be used. However, in the discussion below it is assumed that the Flex protocol is used.

The communication protocol 300 comprises a plurality of synchronous frames 302 (shown as F0, F1, F2, . . . , F127, by way of example). The frames are transmitted during a periodically occurring time span corresponding to a transmission cycle which has a predetermined duration (e.g., 4 minutes), and which includes a predetermined number of frames (e.g., 128 frames). Each frame corresponds to a predetermined time interval (e.g., 1.875 seconds).

A frame includes an outbound sync 304, an optional selective call address 306, a message vector 308, and an outbound message 310. The outbound sync 304 is used by the selective call receivers 102 as a means for bit synchronization utilizing techniques well known in the art. The selective call address 306 is used when selective call messages are transmitted by the high power transmitter 104 to one or more addressed selective call receivers. When a message code is transmitted by the low power transmitter 108, selective call messaging is not required, because the message code is normally intended to be received by all selective call receivers 102 located within the transmission range of the low power transmitter 108. Under these circumstances, the selective call address 306 is not used.

The message vector 308 points to a time within the signaling format of the communication protocol 300 corresponding to the position of the outbound message 310 intended to be intercepted by the selective call receiver 102. The outbound message 310 comprises a selective call message 312 when the high power transmitter 104 is transmitting the outbound message 310, or a message code 314 when the outbound message 310 is transmitted by a low power transmitter 108.

Figure 4:
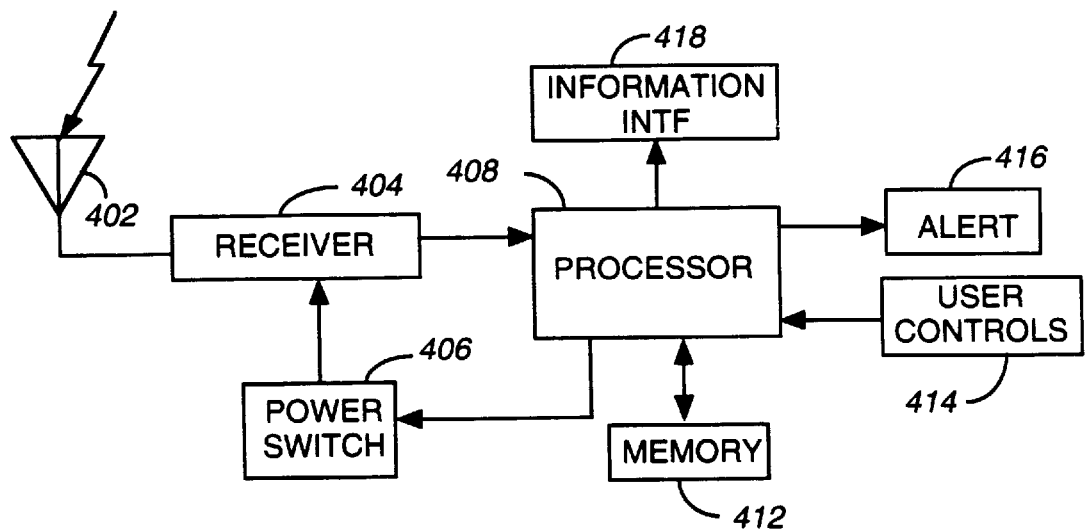
FIG. 4 is an electrical block diagram of a selective call receiver according to the present invention.

FIG. 4 is an electrical block diagram of a selective call receiver 102 that operates according to the present invention. The selective call receiver 102 comprises a receiver antenna 402, a receiver 404, a power switch 406, a processor 408, a memory 412, user controls 414, an alerting device 416, and an information interface 418. All the hardware included in the selective call receiver may be conventional.

The receiver antenna 402 is a conventional antenna capable of intercepting FSK signals transmitted from either the high power transmitter 104, or one of the low power transmitters 108. The receiver 404 is a conventional FSK receiver for receiving information during at least one predetermined frame of the communication protocol 300, and for decoding the received information to provide decoded information to the processor 408.

The processor 408 is a conventional processor such as, for example, an MC68HC11 manufactured by Motorola, Inc. The memory 412 coupled to the processor 408 is a conventional memory that includes, for example, a read-only memory (ROM), a random-access memory (RAM), and an electrically erasable read-only memory (EEPROM). The ROM is used for storing the programming information of the processor 408. The programming information directs the processor 408 in controlling the operation of the selective call receiver 102. The RAM is used, for example, for message processing and for storage of selective call messages. The EEPROM is used for storing at least one selective call address for identifying the selective call receiver 102, and for storing at least one canned message. As used herein, the term "canned message" means a message that has been previously stored in memory and is retained for future presentation upon demand.

The power switch 406 is a conventional switch controlled by the processor 408 for strobing the power sourced to the receiver 404, thereby providing a battery saving function.

The processor 408 is programmed to be responsive to decoded information generated by the receiver 404. When the decoded information is a message code 314 received from a low power transmitter, the processor 408 is programmed to identify a corresponding canned message stored in the EEPROM of the memory 412. The selection of the canned message is based, at least in part, on the frame in which the message code 314 was received. As described in greater detail below, this enables the selective call receiver 102 to select and present to its user a certain canned message that is identified by virtue of the frame during which the message code 314 (or other information) was received. This also enables the selective call receiver 102 to determine its location, i.e., which small coverage area 112 it is located in. In contrast, when the decoded information is a selective call message 312 received from the high power transmitter (such as a typical personal message like "call home"), the processor 408 is programmed to store the selective call message 312 in the RAM.

For both types of messages, the processor 408 is further programmed to alert the user of pending message(s) by way of the alerting device 416, which uses a conventional tactile or audible alerting mechanism. Once the user has been alerted, the user can invoke functions provided by the user controls 414 to perceive the pending message(s). In response to invoking the user controls 414, the processor 408 directs the pending message(s) to the information interface 418. The information interface 418 presents the pending message(s) to the user by way of a conventional liquid crystal display (LCD), or alternatively a conventional audible device for playing out audible messages.

Figure 5:
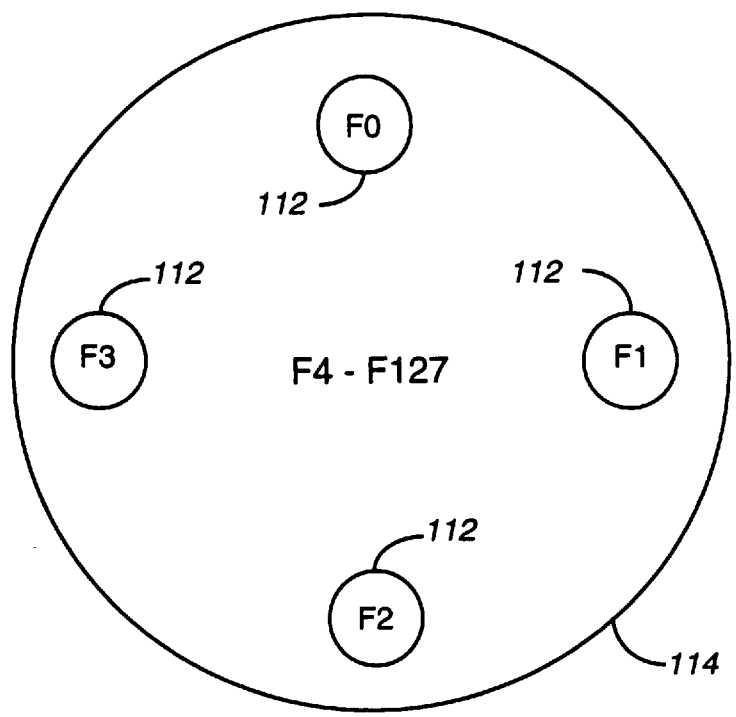
FIG. 5 is a diagram depicting frame assignments in a non-frame reuse communication system operating according to the present invention.

FIG. 5 is a diagram depicting exemplary frame assignments in a communication system according to the present invention that does not employ frame reuse, i.e., does not assign a particular frame to more than one low power transmitter 108. In this example, the diagram shows four small coverage areas 112, each of which is assigned one of the frames 0 through 3 (shown as F0, F1, F2, F3). A low power transmitter 108 is located in each of the areas 112, as shown in FIG. 1. In the small coverage area 112 identified by F0, the low power transmitter located therein transmits message codes in frame 0. In the other small coverage areas 112, identified by F1, F2 and F3, the low power transmitters located therein transmit message codes during frames 1, 2, and 3, respectively. Thus, in the arrangement shown in FIG. 5, all of the low power transmitters transmit during frames that are different from each other and different from the frames used by the high power transmitter 104.

A high power transmitter 104 is located in the wide coverage area 114, also as shown in FIG. 1. This high power transmitter is assigned the remainder of frames 4 through 127.

The low power transmitters 108 transmit message codes 314 (FIG. 3) during their assigned frames (F0 through F3), but during all other frames the low power transmitters 108 are inhibited from transmitting message codes 314. Similarly, the high power transmitter 104 transmits during frames 4 through 127, and is inhibited from transmitting during frames 0 through 3. Thus, in the arrangement shown in FIG. 5, each transmitter is assigned one or more frames that are mutually exclusive from the other transmitters. This frame assignment plan substantially prevents signal interference between adjacent transmitters in the communication system.

Frame assignments other than those depicted in FIG. 5 can also be used. For example, if the system operator wishes to allocate more transmission time to the low power transmitters, one way of accomplishing that is to permit each of the transmitters of FIG. 5 to transmit on a first unique frame, and then on each of the following fifth frames. Thus, the transmitter in area 112 that is depicted as transmitting during frame 0 (F0) can also transmit during every fifth frame thereafter, e.g., during frames 5, 10, 15, etc. The transmitter assigned to frame 1 (F1) would transmit during frames 1, 6, 11, etc. The high power transmitter would transmit during frames 4, 9, 14, etc. The other low power transmitters follow the same pattern. Other frame assignments can also be made, depending on the needs of the users of the system.

Figures 6, 7:
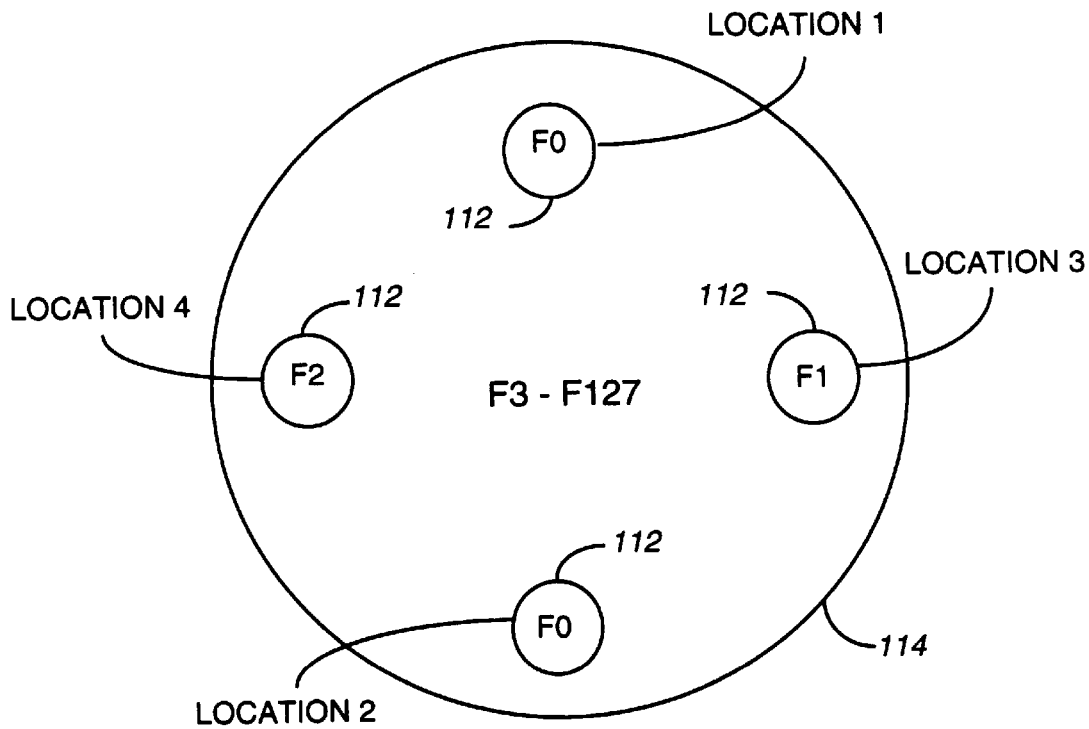
FIG. 6 is a diagram depicting frame assignments in a combined frame reuse and non-frame reuse communication system operating according to the present invention.
FIG. 7 is a diagram depicting the arrangement of canned messages in the selective call receiver of FIG. 4.

FIG. 6 is a diagram depicting frame assignments in a communication system according to the present invention that employs frame reuse, i.e., that assigns the same frame to more than one transmitter. The diagram includes four small coverage areas 112 identified as location 1, location 2, location 3 and location 4. These areas are assigned frames 0, 0, 1, and 2 (shown as F0, F0, F1, F2). A low power transmitter 108 is located in each of the areas 112, as shown in FIG. 1.

In location 1, the low power transmitter located therein transmits message codes in frame 0. In locations 2, 3, and 4, the low power transmitters located therein transmit message codes in frames 0, 1 and 2, respectively. Thus, with the arrangement shown in FIG. 6, low power transmitters that are mutually remote from each other (locations 1 and 2) are allowed to transmit during a common frame (frame 0 in this example). The distance separating them assures a lack of significant interference by transmitters operating during the same frame. However, transmitters that are adjacent to each other, and more likely to interfere with each other, are preferably required to transmit during different frames. The wide coverage area 114 is assigned the remainder of frames 3 through 127.

As with the arrangement of FIG. 5, the low power transmitters used in FIG. 6 transmit message codes 314 only during their assigned frames. During all other frames, the low power transmitters 108 are inhibited from transmitting message codes 314. Similarly, the high power transmitter 104 transmits on frames 3 through 127, and is inhibited from transmitting on frames 0 through 2. This frame assignment plan successfully combines non-frame reuse and frame reuse plans with substantially minimal signal interference in the one-way communication system.

FIG. 7 is a diagram depicting the preferred arrangement of canned messages in the memory 412 of the selective call receiver 102. The canned messages are conventionally preprogrammed in the EEPROM of the memory 412 by a service provider of the selective call receiver 102. Each group of canned messages is associated with the location of a small coverage area 112 corresponding to a low power transmitter 108. In this example, the first group of canned messages is associated with location 1 in which a low power transmitter transmits during frame 0. The next group of canned messages is associated with location 2, which is relatively remote from location 1, and whose low power transmitter also transmits during frame 0. The other canned messages are similarly associated with locations 3 and 4.

The selective call receiver 102 selects one of its canned messages in the following manner. Referring back to FIG. 7, it can be seen that a selective call receiver 102 stores canned messages 1 through 10 that are associated with location 1 in FIG. 6. Each of the canned messages 1–10 is selected and presented to the user in response to receiving a message code 1 through 10, respectively, during frame 0. Thus, if a selective call receiver 102 receives message code 10 during frame 0, canned message 10 is selected and presented to the user of the selective call receiver 102. Such a canned message may tell the user that "You are in location 1" or "The exhibits in location 1 will close in 10 minutes", for example.

If a selective call receiver receives message code 11 during frame 0, it will select canned message 11 which may tell the user something relevant to location 2.

Similarly, receipt of a message code 1 through 10 during frame 1 causes the selective call receiver 102 to select the corresponding canned message among messages 21–30; and receipt of a message code 1 through 10 during frame 2 causes the selective call receiver 102 to select the corresponding canned message among messages 31–40.

It will be appreciated that an advantage of the present communication system is that a selective call receiver can determine its location based, in whole or in part (depending on the extent of frame reuse) on the frame in which it receives information. For example, when the selective call receiver 102 receives message code 5 in frame 0, the selective call receiver 102 knows that it is in location 1. When the selective call receiver 102 receives a message code in frame 1, the selective call receiver 102 knows that it is in location 3. Note that determination of location does not require receipt of a message code when information is received during a frame that is unique to one of the locations 112. Thus, a selective call receiver 102 that receives any information during frame 2 will know that it must be in location 4.

It will be appreciated that locations assigned non-reuse frames can reuse message codes (as in the case of locations 3 and 4), while locations assigned reuse frames must be assigned unique message codes (as in the case of locations 1 and 2) in order for selective call receivers 102 to be able to determine which small coverage area 112 they are located in.

It will be further appreciated that in the case where message codes 314 are accompanied by message information, the selective call receiver 102 presents the message information to the user by way of the information interface 418. The message code 314 number informs the selective call receiver 102 of its location, and that message information is appended to the message code 314.

It will also be appreciated that the message code 314 is also used by the selective call receiver 102 for identifying a canned message. The selective call receiver 102 presents the canned message and message information to the user by way of the information interface 418. For instance, the user might be told through the information interface 418, "News Flash! Exhibit 4 in location 1 is now open." The message "News Flash" is, for example, a canned message corresponding to the message code 314, while the message "Exhibit 4 in location 1 is now open" is, for example, the message information.

Figure 8:
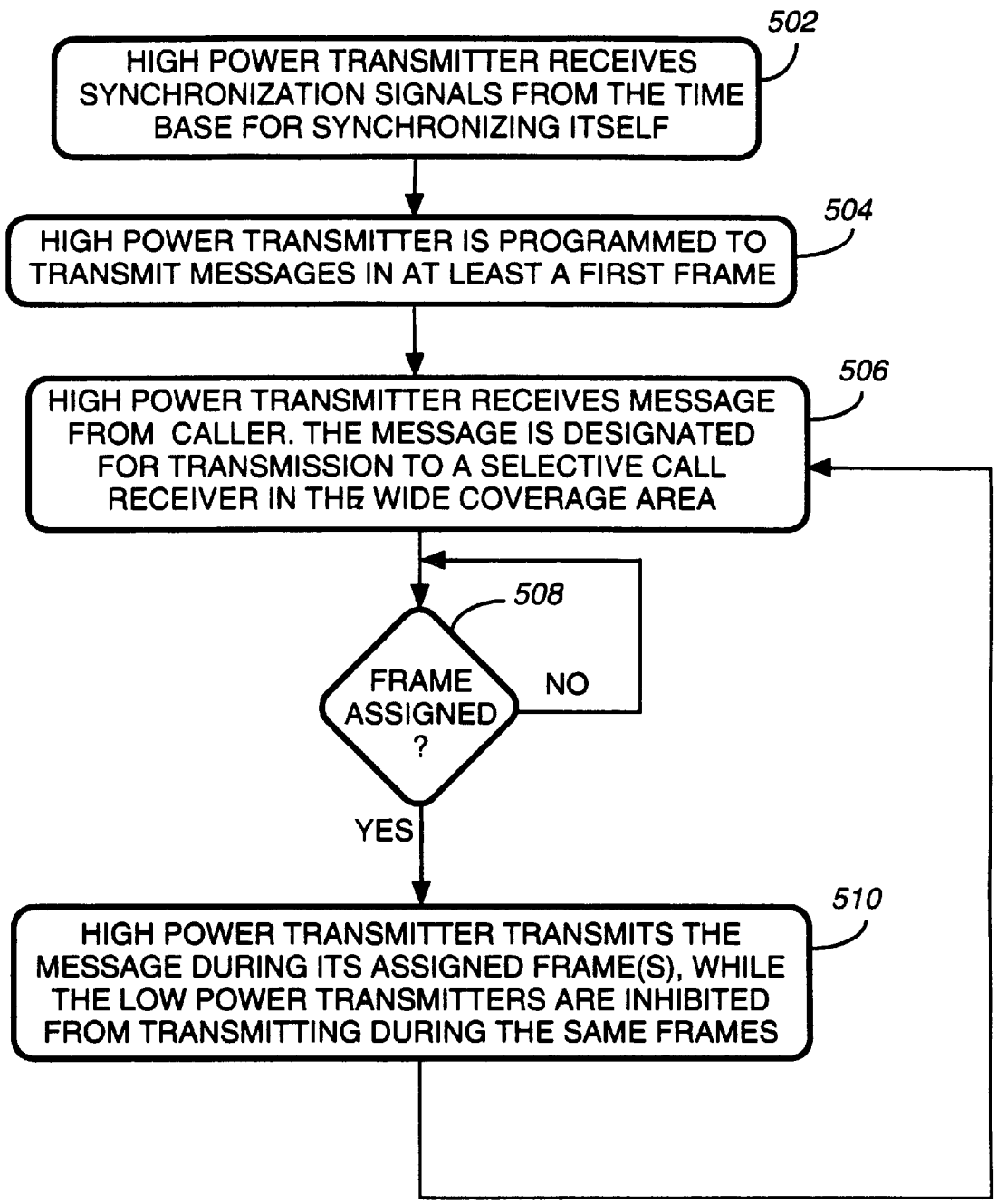
FIG. 8 is a flow chart showing how the high power transmitter operates according to the present invention.

FIG. 8 is a flow chart 500 of the high power transmitter 104 operation according to the present invention. Instructions that correspond to the steps shown in the flow chart 500 are programmed into the controller 206 of the transmitter 104.

The flow chart 500 begins with step 502 where the high power transmitter 104 receives synchronization signals from the time base 212 for synchronizing the high power transmitter 104 to frames 302 included in the periodically occurring transmission cycle of the communication protocol 300. In step 504, the high power transmitter 104 transmits selective call messages 312 in at least a first predetermined time interval corresponding to at least a first frame assigned to the high power transmitter 104. Using the example shown in FIG. 5, the high power transmitter 104 transmits messages during frames F4 through F127, although it is not a requirement of this invention that the high power transmitter 104 transmit during more than one frame.

In step 506, the high power transmitter 104 receives a message from a caller using the PSTN. The message is designated for transmission to one of the selective call receivers 102 in the wide coverage area 114. In step 508, the high power transmitter 104 waits for the arrival of an assigned frame 302 before transmitting the selective call message 312. When an assigned frame 302 arrives, the program proceeds to step 510 where it transmits the selective call message 312 during at least the first assigned frame, while the low power transmitters 108 are inhibited from transmitting during the same frame(s). Once the selective call message 312 has been transmitted, the high power transmitter 104 returns to step 506 to process further messages received from callers. This process continues until all messages have been transmitted or until the allotted time for the assigned frames has elapsed.

Figure 9:
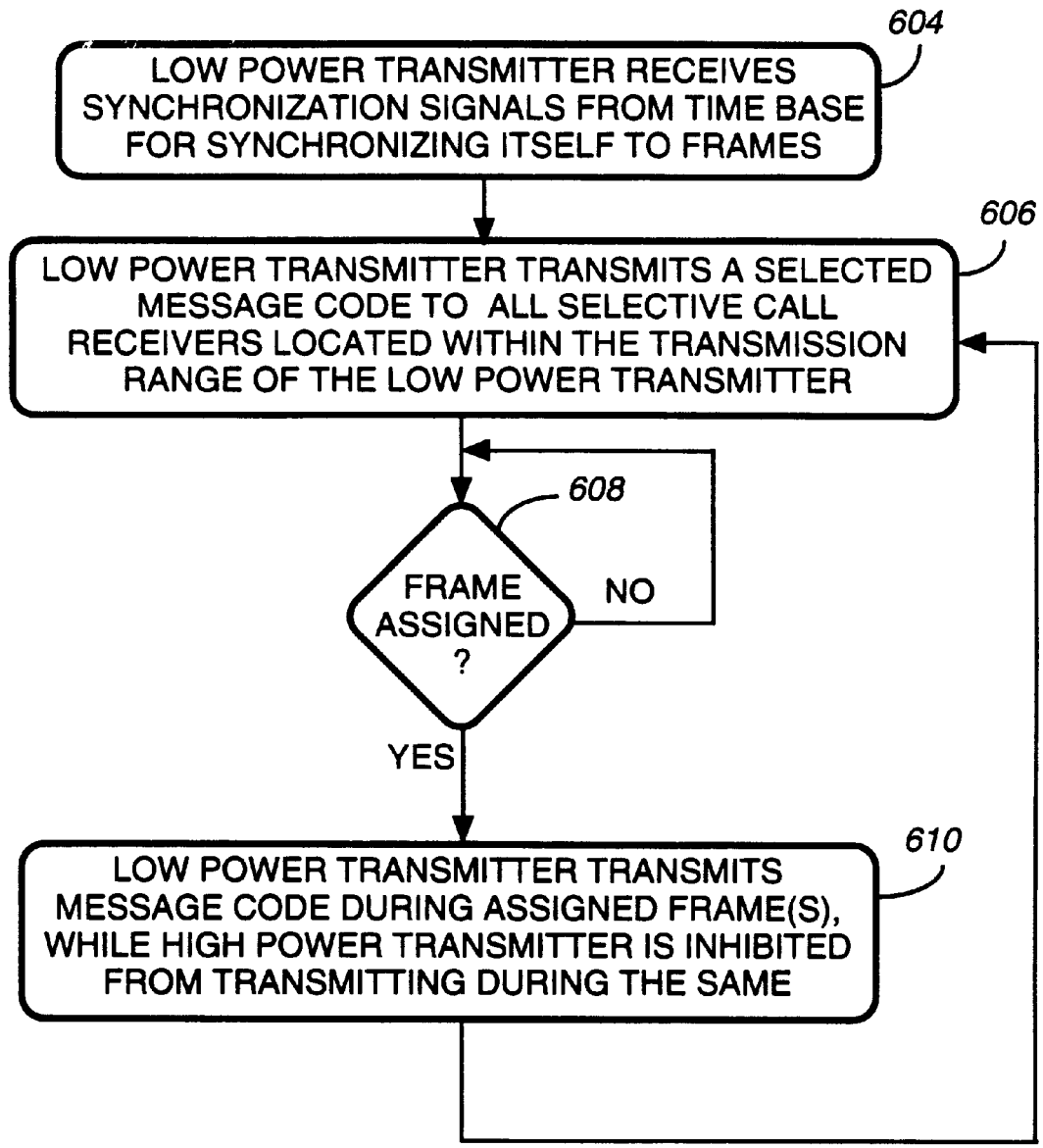
FIG. 9 is a flow chart showing how the low power transmitter operates according to the present invention.

FIG. 9 is a flow chart 600 of the low power transmitter 108 operation according to the present invention. Instructions that correspond to the steps shown in the flow chart 600 are programmed into the controller of each low power transmitter 108.

Prior to operation in the field, the low power transmitter 108 is programmed by a service provider with message codes to be selectively transmitted in at least a second predetermined time interval corresponding to at least a second frame assigned to the low power transmitter 108.

The flow chart 600 begins with step 604 where the low power transmitter 108 receives synchronization signals from the time base 212 for synchronizing the low power transmitter to frames 302 included in the periodically occurring transmission cycle of the communication protocol 300. In step 606, the low power transmitter 108 selects a message code 314 from the group of message codes preprogrammed by the service provider. The selected message code is designated for transmission to all selective call receivers 102 located within the transmission range of the low power transmitter 108. In step 608, the low power transmitter 108 waits for an assigned frame 302 before transmitting the message code 314. Using the example shown in FIG. 5, the low power transmitter 108 waits for one of the frames 0, 1, 2 or 3, depending on which low power transmitter 108 is preparing to transmit.

When an assigned frame 302 arrives, the low power transmitter 108 proceeds to step 610 where it transmits the selective call message code 314 during its assigned frame(s), while the high power transmitter 104 is inhibited from transmitting during the same frame(s). Once the message code 314 has been transmitted, the program proceeds to step 606 to select further message codes for transmission.

Figure 10:
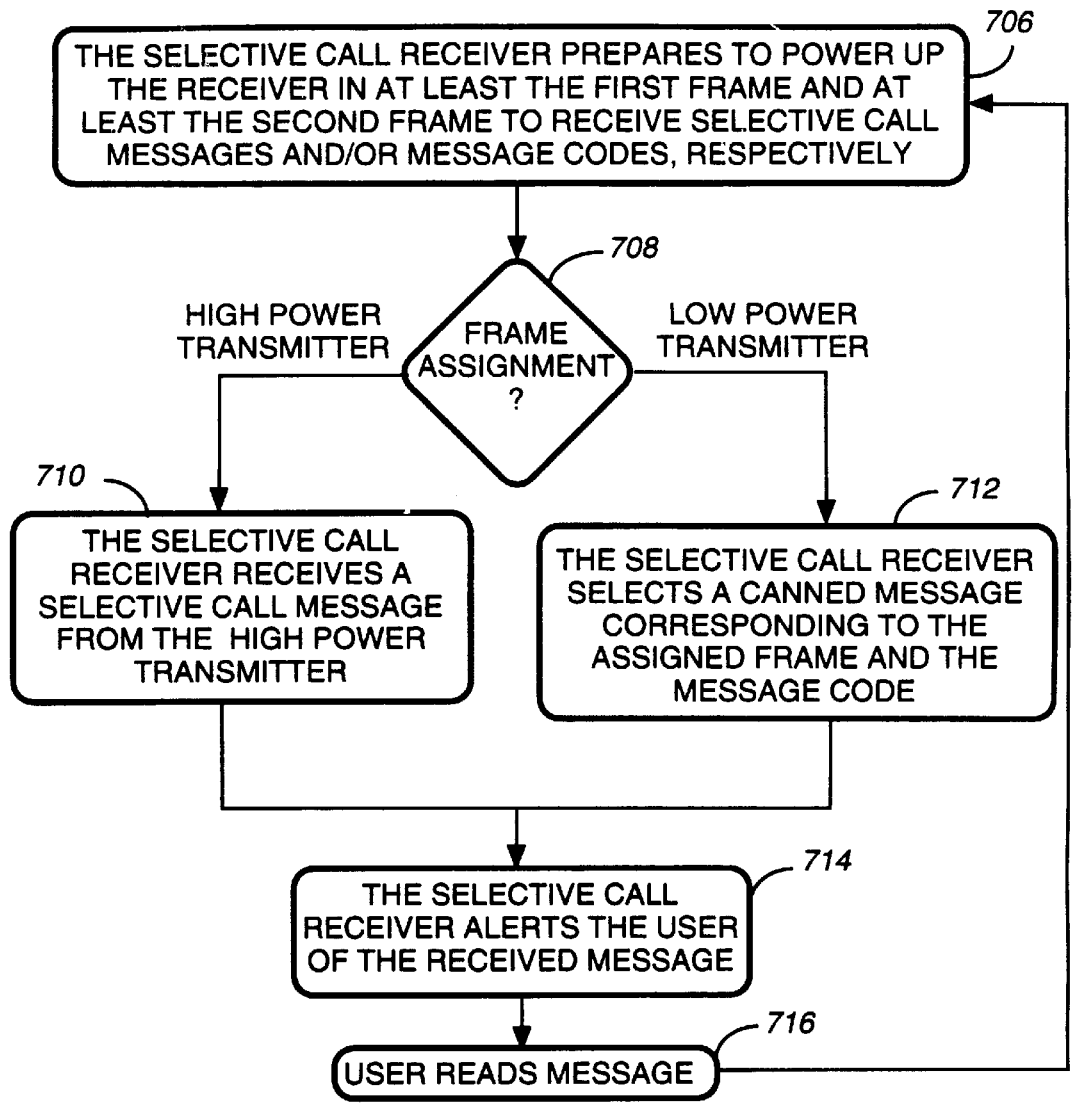
FIG. 10 is a flow chart showing how the selective call receiver operates according to the present invention.

FIG. 10 is a flow chart 700 showing how the selective call receiver 102 is programmed to operate according to the present invention. Instructions that correspond to the steps shown in the flow chart 700 are stored in the memory of the selective call receiver 102.

Prior to operation in the field, the selective call receiver 102 is programmed with groups of canned messages stored in the memory 412. Each group of canned messages is associated with message codes and frames corresponding to the location of each low power transmitter 108 in the communication system. The selective call receiver 102 is further programmed to receive selective call messages 312 in at least a first frame from the high power transmitter 104, and message codes 314 in at least a second frame from a low power transmitter 108.

For example, the selective call receiver 102 may be programmed to receive transmissions from the high power transmitter 104 during frames 4 through 127, and to receive transmissions from a low power transmitter 108 during frame 0 (assuming that the selective call receiver is expected to remain in the small coverage area in which transmissions are made during frame 0). If the selective call receiver 102 is expected to move from one to another of all the small coverage areas 112, then it should be programmed to receive transmissions during all the frames assigned to the low power transmitters 108 (i.e., frames 0, 1, 2 and 3).

The flow chart 700 begins with step 706 where the selective call receiver 102 prepares to power up the receiver 404 during its assigned frames to receive selective call messages 312 and/or message codes 314, respectively. In step 708, the selective call receiver 102 waits for the arrival of an assigned frame. Assuming that one of the frames 4–127 arrives, (assigned to the high power transmitter), the program proceeds to step 710 to process the message sent by the high power transmitter. When one of the frames 0–3 (assigned to the low power transmitters) arrives and a message code 314 is intercepted, the program proceeds to step 712 where it selects a canned message corresponding to the assigned frame and message code 314 received.

Once the selective call message 312 and/or the message code 314 has been processed, the selective call receiver 102 proceeds to step 714 where it alerts the user, by way of the alerting device 416, of the pending message(s) received. In step 716, the user reads the message by invoking functions provided by the user controls 414. The selective call receiver 102 then returns to step 706 to prepare to receive further messages from the communication system.

The present invention provides a simple and low cost method for delivery of messages by wireless local area networks located within a wireless wide area network, with both networks operating on the same RF channel, and without the relatively long periods of latency sometimes experienced with prior systems. A selective call receiver operating within the communication network is able to determine which local area it is located in on the basis of which frame and/or message code is used. In addition, the association of message codes with frames allows the reuse of frames among low power transmitters without relinquishing the capability of the selective call receivers to identify the location of the low power transmitters.

What is claimed is:

1. For use in a communication system having at least a first transmitter transmitting information on a first frame and a second transmitter transmitting information on a second frame of a periodic transmission cycle, a selective call receiver, comprising:

circuitry for receiving information including at least one of a message code received during the first frame from the first transmitter and a same message code received during the second frame from a second transmitter;

a memory for storing a first and a second canned message, wherein the first canned message corresponds to the message code being received in the first frame and the second canned message corresponds to the same message code being received in the second frame; and a processor coupled to the memory and responsive to the message code for identifying the first canned message in the memory corresponding to the message code and the first frame, and identifying the second canned message in memory corresponding to the same message code and the second frame.

2. A selective call receiver as set forth in claim 1 wherein at least two transmitters that are remotely located from each other transmit during a common frame and transmit different message codes, wherein each stored canned message is associated with a transmitter and with a message code, and wherein the processor identifies a stored canned message based on a received message code and on which frame the message code is received in.

3. A selective call receiver as set forth in claim 1 wherein the circuitry for receiving information including the message code decodes the received message code and generates a decoded message code, and further wherein the processor is responsive to the decoded message code.

4. For use in a communication system having at least a first transmitter transmitting information on a first frame and a second transmitter transmitting information on a second frame of a periodic transmission cycle, a selective call receiver, comprising:

circuitry for receiving information including at least one of a message code received during the first frame from the first transmitter and a same message code received during the second frame from a second transmitter;

a memory for storing a first and second group of canned messages, wherein the first group of canned messages correspond to the message codes received in the first frame and the second group of canned messages corresponds to the same message codes received in the second frame; and a processor coupled to the memory and responsive to the message code for identifying a first canned message of the first group of canned messages in the memory corresponding to the message code and the first frame, and identifying a second canned message of the second group of canned messages in memory corresponding to the same message code and the second frame.

\* \* \* \* \*